United States Patent [19]

Berrer et al.

[11] Patent Number: 5,034,244

[45] Date of Patent: Jul. 23, 1991

[54] METHOD FOR PRINTING

[75] Inventors: Irmin Berrer, Gk Eijsden; Johannes F. Witteveen, Gg Bunde, both of Netherlands

[73] Assignee: Johnson Matthey Public Limited Company, United Kingdom

[21] Appl. No.: 361,297

[22] Filed: Jun. 5, 1989

[30] Foreign Application Priority Data

Jun. 8, 1988 [GB] United Kingdom ............... 8813510

[51] Int. Cl.$^5$ .................. B05D 3/02; B05D 3/06; B05D 5/00
[52] U.S. Cl. .................. 427/54.1; 427/229; 427/265; 427/266; 427/279; 427/376.2
[58] Field of Search ............ 427/266, 279, 229, 54.1, 427/265, 376.2

[56] References Cited

U.S. PATENT DOCUMENTS

| | | | |
|---|---|---|---|
| 2,733,167 | 1/1956 | Stookey | 106/1.23 X |
| 4,260,406 | 4/1981 | Corbett et al. | 427/279 X |
| 4,306,012 | 12/1981 | Scheve . | |
| 4,407,847 | 10/1983 | Boaz | 427/266 X |

FOREIGN PATENT DOCUMENTS

| | | |
|---|---|---|
| 0106628 | 4/1984 | European Pat. Off. . |
| 3611273 | 6/1987 | Fed. Rep. of Germany . |
| 3616547 | 9/1987 | Fed. Rep. of Germany . |
| 1383497 | 2/1964 | France . |

OTHER PUBLICATIONS

English translation of German Patent Publication No. 3611273, PTO 90-4528, U.S. Patent and Trademark Office, Washington, D.C., Sep. 1990.

English translation of German Patent Publication No. 3616547, PTO-4539, U.S. Patent and Trademark Office, Washington, D.C., Sep. 1990.

English translation of French Patent 1,383,497, PTO 90-4522, U.S. Patent and Trademark Office, Washington, D.C., Sep. 1990.

*Primary Examiner*—Evan Lawrence
*Attorney, Agent, or Firm*—Stevens, Davis, Miller & Mosher

[57] ABSTRACT

Heat resistant substrates of glass, metal or ceramic are coated by applying onto the substrate a layer of radiation-curable and firable printing ink containing an inorganic ceramic color, curing the layer by exposure to radiation and applying onto the substrate on or adjacent to the radiation curable ink a firable printing ink in the form of a gel containing a precious metal. The coatings may be applied at successive stations of a single automatically operated printing machine, after which the substrates can be fired.

9 Claims, No Drawings

METHOD FOR PRINTING

This invention relates to a method for coating a heat resistant substrate of glass, metal or ceramics. In particular, it relates to a method as aforesaid that enables the substrate to be printed with a firable precious metal-containing printing ink on or adjacent to a previously printed layer of ink containing a ceramic color.

In the decorating of articles by firable inks it is sometimes required to coat a printing ink containing a precious metal onto a previously printed ink layer containing a ceramic color. Up to now, this has been done by two successive wet screen printing operations, but the procedure involved is time-consuming because the ink layer on the substrate has to be dried, for example for 2 hours, after each printing operation. Such a multi-step sequence of printing and drying operations cannot readily be carried out in continuous automatic printing machines.

It is an object of the invention to provide a method for printing a ceramic color combined with a subsequent printing on or adjacent to the ceramic color of a firable ink containing a precious metal that enables both printing operations to be carried out in succession in a single automatically operated printing machine. This is not only quicker and more convenient but also facilitates good registry between the precious metal color and the ceramic color.

The invention provides a method for coating a heat resistant substrate of glass, metal or ceramic comprising:

(a) applying onto the substrate a layer of a radiation-curable and firable printing ink containing an inorganic ceramic color.

(b) curing the layer by exposure to radiation; and (c) applying onto the substrate on or adjacent to the radiation-curable ink a firable printing ink in the form of a gel containing a precious metal.

The precious metal colors can be printed onto visible light-hardening or more commonly UV-hardening colors in a wet (thick paste) or thermoplastic ink and the UV-hardening colors are also compatible with normal wet or thermoplastic colors. The inks can be applied by direct printing, and firing directly after printing is possible. The UV-hardening colors can be applied by conventional screens, and a UV-hardening unit can easily be fitted into the printing machine and is easily transferred from place to place in the machine to meet varying printing requirements. The UV curing unit is easy to adapt to a particular article being printed and to a particular decoration being applied.

The resulting fired coatings from the present method have remarkably good film integrity. Their precious metal color is not marred by diffusion into the underlying print layer, as can happen with other methods. Thus, for instance, the present method can produce a gold rather than a mauve color when using a gold printing ink over a white enamel.

In the present method, the precious metal-containing printing ink employed must be a gel. We have found that if it is not, the method does not work; the precious metal diffuses into the underlying layer or the fired coating does not have good film integrity. It is believed that by applying the precious metal in the form of a gel, the precious metal is held back so that in the subsequent firing it does not diffuse into the underlying layer, and materials can evaporate off from the underlying layer in the firing without disrupting the film.

It has been found that the chemical and mechanical resistance of the fired coatings resulting from the present method are as good as the coatings achieved by a sequence of conventional wet screen printing operations but that there is a substantial gain in throughput achievable and in the economics of the process because automatic machines can be employed. The process of the invention is compatible with conventional screen printing of firable inks, provided that in areas to underlie or be adjacent to the precious metal-containing ink the earlier printed layer should be of a radiation-curable ink. Other application techniques than screen printing may be employed, e.g. offset printing such as silicon pad printing TP (thermoplastic) golds and the like and TP white. Though it is preferred that the precious metal-containing ink be applied directly to the substrate, for instance because color registry is better, it can be applied indirectly, in the form of a transfer (decalcomania).

Thus the method may involve the following stages:

(a) an article of, e.g., glass holloware may optionally be printed by conventional methods in areas not intended to be overprinted with or to lie next to precious metal with one or more conventional firable printing inks containing coloring materials;

(b) the article is printed in areas to be overprinted with or to lie adjacent to precious metal with a printing ink containing an enamel color in a UV-hardenable or other radiation-curable medium. The term "enamel color" is understood to mean a dry particulate mixture of one or more inorganic pigments and a vitreous frit, and any such enamel can be used with equal effectiveness in printing inks according to this invention provided that the frit is molten at the intended peak firing temperatures. The ink may be applied to the article by screen printing, banding or lining by brush, roller or offset techniques;

(c) the previously printed enamel color layer is hardened by exposure to radiation, preferably UV light. Very brief exposure of a few seconds or less is sufficient to effect a satisfactory cure, and the resulting film is resistant to damage caused by rubbing, scratching or scuffing and can be over-printed with little risk of damage. The particular degree of cure will depend on a number of parameters such as line speed, number, power, types and positioning of UV lamps and the like, and the conditions of cure need to be determined empirically for each case. Overcure should be avoided because it can lead to pin-holes in the precious metal film or blistering of the enamel, whereas undercure can result in effects such as smearing during printing, pin-holes, blistering and poor reverse aspect resulting from diffusion of the precious metals into the enamel;

(d) the article is now printed as aforesaid with inks providing one or more consecutive colors including one or more precious metal color applied in the form of a gel on and/or adjacent to the ink printed in step (c); and (e) on completion of decorative printing the article is fired.

The above sequence of operations (a)-(d) can be carried out continuously in a printing machine which can be operated automatically. It employs radiation-curable, usually visible or UV-hardenable, inorganic ceramic printing inks that can be overprinted one on another. The gel printing inks containing the precious metals can be printed direct onto the radiation-curable, preferably UV-hardenable inks once they have been hardened and exhibit good compatibility therewith.

The ink containing the inorganic ceramic color should accept overprinting by precious metal colors, should have good working stability, should be capable of being printed continuously and should have good mechanical and chemical resistance after firing. It should contain from 40 to 85% by weight of enamel, the balance (15 to 60%) being radiation-curable, preferably UV-hardenable, medium. Preferably the inks contain from 60 to 80% by weight enamel, the balance being medium. Below 40% enamel the inks have insufficient opacity, whereas at above 85% the viscosity is too high for satisfactory application to the substrate. The medium should be of appropriate viscosity for application by the selected printing method when admixed with the enamel color and must be susceptible to free radical polymerization and therefore should contain ethylenic unsaturation, preferably as vinyl groups. On firing it should be capable of burning cleanly away without leaving a residue. Suitable media for this purpose may be based on solutions of a substantially fully-polymerized thermoplastic resin and photoinitiator(s) in one or a mixture of several radiation-curable diluents. Examples of the preferred type of resin include fully polymerized homo- and copolymers of (meth) acrylic monomers (e.g. methyl- or butylmethacrylate) whereas mono- and multifunctional acrylic monomers and mixtures thereof have proven to be suitable radiation-curable diluents (the functionality being a measure of acrylate groups available per molecule). The photoinitiator(s) may be selected from such compounds known in the art, especially carbonyl compounds such as aldehydes and ketones and derivatives thereof. Examples of suitable photoinitiators comprise both intra-molecular types (e.g. benzildimethylketal available as "Irgacure 651" from Ciba-Geigy and hydroxyalkylphenones, "Darocure" range, Merck) and inter-molecular types, e.g. benzophenone, benzil (diphenylethanedione) and several thioxanthone derivatives available from e.g. Ward Blenkinsop ("Quantacure") and Nippon Kayaku ("Kayacure"). The latter group of photoinitiators requires the presence of a hydrogen donor as co-initiator or activator i.e. in the case of thioxanthones a tertiary amine as also available from Ward Blenkinsop ("Quantacure" EPD, DMB) or BASF.

The nature and amount of photoinitiator(s) added is governed by the nature of the pigment and frit and by the required hardness of the cured film. The choice of the photoinitiating system is also influenced by the wavelength of radiation to be used. Preferably the radiation has a peak wavelength of about 350 nm. The required power for a suitable cure depends in part on the line speed to be used and the positioning of the lamps, but 80 Watts.cm$^{-1}$ is typical. The printing ink may contain certain inessential additives for particular purposes for example wetting agents, defoamers, rheology modifiers etc., to optimize application performance. Such additives may or may not be soluble in the diluent, should not interfere with curing and should be compatible with the other components in the enamel ink and in the precious metal preparation as well. The enamel ink is usually such as to produce a matt finish.

The radiation-curable firable printing ink can be a known such ink, in particular as described in European patent specification No. 106628A1.

The ink containing the precious metal may contain gold, silver, platinum or palladium and may be formulated to provide a bright or a burnish aspect. Combinations of gold or platinum on white or black enamels can be printed by the present method, but other shades may be employed with appropriate selection of the photoinitiating system of the UV-curable layer to avoid interference with the UV-absorption/scattering of the pigment. In a preferred embodiment the precious metal is gold, especially bright gold. The precious metal may be present in the ink as an organometallic sulphur compound and where the ink is to be applied by "wet" direct screening it can be formulated as a thick paste which is air drying by evaporation of a volatile solvent. Preferably however, the ink is formulated as a wax that is liquid at its application temperatures, usually 45°–90° C., preferably 55°–60° C., but that solidifies at ambient temperatures of about 25° C. (thermoplastic application techniques). Such a wax formulation cools almost immediately on contact with the substrate and can be overprinted at subsequent print stations of the printing machine used.

The precious metal coating before firing is usually 10–45 micrometer thick.

The gel ink containing the precious metal can be a known such ink. In one aspect, the ink is a thick paste which dries by evaporation of a solvent. Preferably, however, the ink is a thermoplastic material liquid at elevated temperatures and solid at ambient temperatures and is printed onto the substrate at an elevated temperature.

After applying the gel ink containing the precious metal, the coated substrate can be fired. This can be done in conventional ways. The firing is usually at 450°–1000° C. The firing cycle time is usually 30 minutes–4 hours. When the substrate is glass, a preferred firing temperature is 480°–670° C., for instance about 590° C., and a preferred firing cycle time is 90–120 minutes.

Only a single firing is necessary. It has been found that in the present method a single firing surprisingly allows the firing of both the radiation cured layer and the precious metal layer to produce a coating of good film integrity and colors. Thus, the materials to be evaporated off even from the underlying radiation cured layer evaporate off during the firing without causing unacceptable pin-holes or blisters in the film.

The invention will now be further described with reference to the following examples:

EXAMPLE I

A white screen printing ink was formulated by passing through a triple roll mill a mixture of an enamel and a medium in a weight of 3.1:1. The enamel was a 1:1 mixture (w/w) of two enamels sold by Blythe Colours Ltd, UK under Nos. 43T40 and 43T47 whereas the UV-curable medium is available from Blythe Colours B.V., the Netherlands under the reference number 267/63. The resulting ink had a viscosity of 3000 mPa.s at 21° C. and was applied automatically by screen printing on a "Kammann" 6 color machine (nylon or polyester, mesh size 90T) at a thickness of 20 to 40 μm to articles of glass holloware. The articles were printed at a rate of 40 per minute and then passed under medium pressure mercury vapor lamps giving a power of 80 Watts.cm$^{-1}$.

A direct screening "wet" liquid gold was formulated as a thick paste according to procedures known in the art and comprised gold- and silverorgano-sulphur compounds, elements all known in the art as being desirable for brightness and adhesion of the fired precious metal film such as vanadium, rhodium and silicon in organic form (e.g. as resinates), binders and resinous materials, such as modified rosins and natural occurring hydrocarbons, essential oils and solvents. This gel formulation is available from Blythe Colors B.V., the Netherlands under the reference number GBV 9337. The liquid gold printing ink was screen printed onto the articles using the same Kammann 6-color machine (nylon or polyester mesh size 110T) at a thickness of 15 to 30 μm and at the same speed of 40 articles per minute. The articles were then fired at a peak temperature of 580° C. and with a cycle time of 120 minutes. The resulting white layer had a gold layer deposited thereon which was of good quality and free of defects.

EXAMPLE II

Glass articles that had been printed with a film of cured radiation-polymerizable ink as in Example I were overprinted on the film with a direct screening thermoplastic liquid gold printing ink. The gold preparation was basically prepared with the same organometallic compounds as referred to in Example I, according to the procedures known in the art. However solvents and some of the resins were replaced by waxy materials of both natural and synthetic origin, as known in the art, thus giving the preparation the appropriate thermoplastic characteristics. This gel ink is available from Blythe Colours B.V., the Netherlands, under the reference number GBV 358T. The direct screening printing ink was printed at about 55°-60 ° C. using the Kammann 6-color machine (metal mesh size 110T) at a speed of 40 articles per minute to give a coating thickness of 20–40 μm. During printing the thermoplastic ink had the consistency of a thick paste and hardened rapidly after printing so that it could, if desired, itself be over-printed at subsequent stations of the printing machine. After printing the articles were fired as in Example I.

EXAMPLE III

The procedure of Example I or II was followed except that the bright gold preparation employed was the non-gel wax liquid gold available from Blythe Colours B.V., the Netherlands, under reference number GBV 137.

The fired article had a blistered film and the gold had diffused into the underlying layer producing a mauve rather than a gold color.

What is claimed is:

1. A method for coating a heat resistant substrate of glass, metal or ceramic comprising:
   (a) applying onto the substrate a layer of a radiation-curable and firable printing ink containing an inorganic ceramic color;
   (b) curing the layer by exposure to radiation;
   (c) applying onto the substrate on the radiation-curable ink a firable printing ink in the form of a gel containing a precious metal; and
   (d) thereafter firing the coated substrate.

2. A method according to claim 1 wherein the radiation-curable and firable printing ink and/or the precious metal-containing printing ink are screen printed onto the substrate.

3. A method according to claim 1 wherein the firable precious metal-containing printing ink is a thick paste and dries by evaporation of a solvent.

4. A method according to claim 1 wherein the firable precious metal-containing printing ink is a thermoplastic material liquid at elevated temperatures and solid at ambient temperatures and is printed onto the substrate at an elevated temperature.

5. A method according to claim 1 wherein the precious metal is gold.

6. A method according to claim 5 wherein the precious metal is bright gold.

7. A method according to claim 1 wherein the coated substrate is fired at 450°-1000° C. for 30 minutes-4 hours.

8. A method according to claim 1 wherein the substrate is glass or ceramic holloware.

9. A method according to claim 1 wherein steps (a)–(c) are carried out in a single automatically operated printing machine.

* * * * *